United States Patent Office 2,942,951
Patented June 28, 1960

2,942,951
METHOD FOR THE PRODUCTION OF ALUMINUM CARBIDE

Sheldon G. Wright and Robert M. Fowler, Niagara Falls, N.Y., assignors to Union Carbide Corporation, a corporation of New York No Drawing. Filed May 21, 1957, Ser. No. 660,486

4 Claims. (Cl. 23—208)

This invention relates to the preparation of aluminum carbide and an exothermic reaction mixture therefor.

In the reaction of aluminum and carbon to produce an aluminum carbide product, relatively high temperatures ranging from 1200° C. to 1400° C. are required in order to effect any degree of reaction. The reaction rate at these temperature levels is very slow, however, and even higher temperatures must be employed in order to achieve a reasonable rate of reaction.

The present invention proposes a simple and rapid method for reacting aluminum and carbon to produce aluminum carbide of higher purity without having to resort to excessively high temperatures.

It is, therefore, an important object of the present invention to provide a novel low temperature high speed method of producing a high purity aluminum carbide product.

According to the invention, the energy of activation necessary to initiate a reaction between aluminum and carbon in the production of aluminum carbide may be substantially reduced by the employment of a suitable catalyst. At the same time the rate of reaction is substantially increased. This is accomplished by forming an exothermic reaction mixture of finely divided aluminum, carbon and a suitable catalytic agent and igniting the mixture. This mixture, when heated, ignites at a relatively low temperature and the heat of exothermicity produced is sufficient to sustain the reaction to completion. Suitable catalysts are one or more fluorides, such as sodium fluoride, potassium fluoride, lithium fluoride, and cryolite. The preferred catalyst in the present invention is cryolite ($Na_3AlF_6$), and the temperature required to ignite the mixture is approximately 700° C.

In producing the low ignition exothermic reaction mixture of the invention, any suitable form of carbon may be employed. Examples of suitable carbons are lamp black or carbon black.

The aluminum to be used in the reaction mixture of the present invention should preferably be in its elemental form in order to produce pure aluminum carbide.

In order to provide that substantially all of the aluminum reacts with the carbon, the aluminum and carbon are approximately stoichiometrically proportioned.

Cryolite is added to this charge and well mixed therein in amounts ranging from 3% to 10% by weight. Best results are obtained when the cryolite is present in the mixture in an amount approximating 5% of the charge. Theoretically, the aluminum carbide product contains 75.3% aluminum and 24.7% carbon. Therefore, the ideal conditions for producing aluminum carbide comprise the preparation of a charge of approximately 3 parts of aluminum powder and 1 part of carbon powder to which 0.2 part by weight of cryolite is added.

In practicing the invention in the production of aluminum carbide, a mixture of finely divided aluminum, carbon and cryolite is prepared and heated under a protective atmosphere, for example, argon. The charge is brought up to a temperature of approximately 700° C. at which temperature it ignites. As a result of the exothermic character of the reaction mixture, sufficient heat is generated to render the reaction self-propagating.

In three cryolite-catalyzed experiments, performed in accordance with the present invention, high-purity aluminum carbide was uniformly obtained. The charge in each instance comprised 3 parts by weight of aluminum (12×D mesh size), 1 part by weight of finely divided carbon, to which 5% of a commercial grade of cryolite powder was added. In each instance the mixture was added in an induction furnace and ignited at about 700° C., in an argon protective atmosphere. The reaction proceeded to completion on the strength of the exothermicity produced by ignition of the charges. Yields of about 90% of the theoretical aluminum carbide yield were obtained in each instance with the product having about 85% purity. The argon protective atmosphere was maintained during the entire heating period and during the cooling of the aluminum carbide product to prevent nitride and carbon nitride formations.

Compared with the conventional non-catalyzed method of producing aluminum carbide, the cryolite catalyzed reaction of the invention takes between 3 and 4 hours (including cooling time) when heated to about 700° C.; whereas the standard method requires heating at 1200° C. for from 48 to 72 hours.

It will be understood that modifications and variations may be effected without departing from the spirit and scope of the novel concepts of the present invention.

What is claimed is:

1. In the process for producing aluminum carbide wherein a mixture of aluminum and carbon is heated to temperatures on the order of 1200° C. to 1400° C. and higher, the improvement which comprises including in said mixture catalytic amounts of at least one catalyst selected from the group consisting of sodium fluoride, potassium fluoride, lithium fluoride, and cryolite, and heating said mixture in an inert atmosphere to an ignition temperature of approximately 700° C. whereupon said mixture is ignited and is self-propagating to produce high-purity aluminum carbide in a substantially reduced period of time.

2. The process in accordance with claim 1 wherein the catalyst is present in an amount between 3 and 10 percent by weight.

3. The process in accordance with claim 1 wherein the catalyst is cryolite.

4. The process in accordance with claim 3 wherein cryolite is present in an amount approximating 5 percent by weight.

References Cited in the file of this patent

FOREIGN PATENTS 16,255       Great Britain _____ of 1896

OTHER REFERENCES

Jacobson: "Encyclopedia of Chemical Reactions," vol. 1, page 25, I-23.

H. J. Krase: "Industrial and Engineering Chemistry," vol. 18, 1926, pp. 1287–90.